US007987390B2

(12) United States Patent
Chandrasekaran

(10) Patent No.: US 7,987,390 B2
(45) Date of Patent: Jul. 26, 2011

(54) TECHNIQUES FOR AUTOMATICALLY TRACKING SOFTWARE ERRORS

(75) Inventor: Sashikanth Chandrasekaran, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 338 days.

(21) Appl. No.: 12/116,145

(22) Filed: May 6, 2008

(65) Prior Publication Data

US 2008/0307266 A1    Dec. 11, 2008

Related U.S. Application Data

(62) Division of application No. 10/975,789, filed on Oct. 27, 2004, now Pat. No. 7,373,554.

(60) Provisional application No. 60/612,900, filed on Sep. 24, 2004.

(51) Int. Cl.
*G06F 11/00* (2006.01)
(52) U.S. Cl. .............. 714/38; 714/37; 714/48; 717/124; 717/128
(58) Field of Classification Search ............... 714/37, 714/38, 48; 717/124, 128
See application file for complete search history.

(56) References Cited

U.S. PATENT DOCUMENTS

| | | |
|---|---|---|
| 4,802,165 A | 1/1989 | Ream |
| 5,404,509 A | 4/1995 | Klein |
| 5,428,737 A | 6/1995 | Li |
| 5,519,859 A | 5/1996 | Grace |
| 5,600,206 A | 2/1997 | Cashin |
| 5,625,815 A | 4/1997 | Maier |
| 5,725,240 A | 3/1998 | Kurita |
| 5,758,061 A | 5/1998 | Plum |
| 5,794,252 A | 8/1998 | Bailey |
| 5,799,323 A | 8/1998 | Mosher |
| 5,822,750 A | 10/1998 | Jou |
| 5,864,750 A | 1/1999 | Fossaceca |
| 5,918,037 A | 6/1999 | Tremblay et al. |
| 5,940,819 A | 8/1999 | Beavin |

(Continued)

FOREIGN PATENT DOCUMENTS

EP        0 723 238 A1    7/1996
(Continued)

OTHER PUBLICATIONS

Publication: "Access control in a relational data base management system by query modification" by Stonebraker and Wong, Proc. AMC Ann. Conf. San Diego, CA, Nov. 1974, pp. 180-187.

(Continued)

*Primary Examiner* — Robert Beausoliel
*Assistant Examiner* — Joseph D Manoskey
(74) *Attorney, Agent, or Firm* — Hickman Palermo Truong & Becker LLP

(57) ABSTRACT

Techniques are provided for automatically tracking errors encountered by a software system. An occurrence of an error that affects performance of an operation being performed by a database server is detected. In response to detecting the occurrence, error information about the error is automatically recorded in a storage space within a database that is managed by the database server. The error information is automatically recorded by executing one or more computer instructions in a first code path of the database server, where the first code path is a separate code path than a second code path of the database server that performs the operation whose performance is affected by the error.

24 Claims, 6 Drawing Sheets

U.S. PATENT DOCUMENTS

| | | | |
|---|---|---|---|
| 6,023,509 | A | 2/2000 | Herbert |
| 6,038,678 | A | 3/2000 | Fukushima et al. |
| 6,041,310 | A | 3/2000 | Green |
| 6,064,951 | A | 5/2000 | Park |
| 6,092,062 | A | 7/2000 | Lohman |
| 6,163,858 | A * | 12/2000 | Bodamer ............ 717/124 |
| 6,351,753 | B1 | 2/2002 | Jagadish |
| 6,374,267 | B1 | 2/2002 | Tam |
| 6,382,357 | B1 | 5/2002 | Morrison |
| 6,430,703 | B1 * | 8/2002 | Connor et al. .......... 714/38 |
| 6,553,392 | B1 * | 4/2003 | Mosher et al. .......... 714/20 |
| 6,584,477 | B1 | 6/2003 | Mosher, Jr. |
| 6,757,837 | B1 | 6/2004 | Platt et al. |
| 6,931,573 | B2 | 8/2005 | Adams |
| 7,080,287 | B2 * | 7/2006 | Salem ............... 714/38 |
| 7,117,197 | B1 | 10/2006 | Wong et al. |
| 7,127,448 | B1 | 10/2006 | Wong et al. |
| 7,415,635 | B1 | 8/2008 | Annangi |
| 2002/0059561 | A1 | 5/2002 | Foster et al. |
| 2002/0087949 | A1 * | 7/2002 | Golender et al. ........ 717/124 |
| 2003/0014394 | A1 | 1/2003 | Fujiwara |
| 2003/0018932 | A1 | 1/2003 | Blum et al. |
| 2004/0123187 | A1 | 6/2004 | Colyer |
| 2004/0153823 | A1 * | 8/2004 | Ansari ................ 714/38 |
| 2004/0213261 | A1 | 10/2004 | Willhite et al. |
| 2005/0223361 | A1 | 10/2005 | Belbute |
| 2005/0257272 | A1 | 11/2005 | Nakao |
| 2005/0273667 | A1 | 12/2005 | Shrivastava et al. |
| 2005/0278147 | A1 | 12/2005 | Morton et al. |
| 2006/0168478 | A1 * | 7/2006 | Zakonov .............. 714/38 |

FOREIGN PATENT DOCUMENTS

| | | |
|---|---|---|
| WO | WO9912144 | 3/1999 |
| WO | WO9952047 | 10/1999 |

OTHER PUBLICATIONS

Barry Lewis. Rules for Co-Existence of P-P and P-MP system using different access methods in the same frequency band: ESTI TM4 Work Item DTR/TM04069. Year Apr. 26, 2000 (3 pages).

John L. Berg. Database direction: the next steps, ACM SIGMOD, vol. 8 issue 4, Nov. 1976.

Elmasri et al., Fundamentals of Database Systems, $3^{rd}$ Ed., Addison-Wesley, 2000, pp. 252-253.

Elder et al. Minutes: TC-10 Subcommittee on ADCs. Year Sep. 30, 1999-Oct. 1, 1999 (4 pages).

Kenneth A. Ross. Conjunctive selection condition in main memory, Symposium on Principles of Database Systems, year 2002, p. 109-120.

Benveventano et al. Description logics for semantic query optimization in object-oriented database systems. ACM transaction on Database System (TODS), year 2003, p. 1-50.

Lirbat et al. Eliminating costly redundant computations from SQL trigger executions. International Conference on Management of Data, year 1997, pp. 428-439.

* cited by examiner

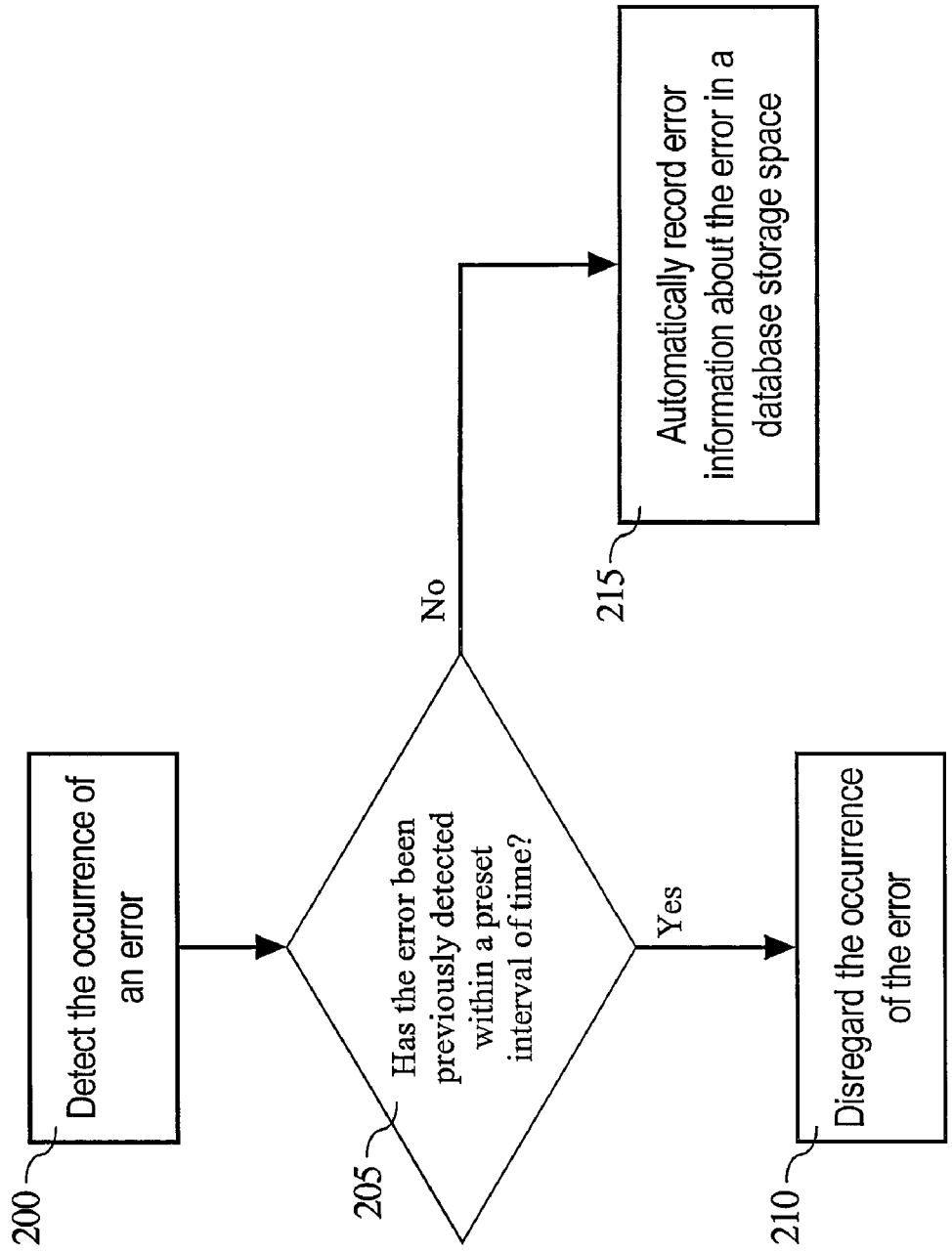

TECHNIQUES FOR AUTOMATICALLY TRACKING SOFTWARE ERRORS

PRIORITY CLAIM; CROSS-REFERENCE TO RELATED APPLICATIONS

This application claims benefit and priority under 35 U.S.C. §120 as a Divisional of U.S. patent application Ser. No. 10/975,789, entitled "TECHNIQUES FOR AUTOMATIC SOFTWARE ERROR DIAGNOSTICS AND CORRECTION" and filed by Sashikanth Chandrasekaran on Oct. 27, 2004 now U.S. Pat. No. 7,373,554, the entire contents of which is hereby incorporated by reference as if fully set forth herein, and which claims the benefit of priority under 35 U.S.C. §119(e) to U.S. Provisional Patent Application Ser. No. 60/612,900, entitled "TECHNIQUES FOR AUTOMATIC SOFTWARE ERROR DIAGNOSTICS AND CORRECTION" and filed by Sashikanth Chandrasekaran on Sep. 24, 2004, the entire contents of which is hereby incorporated by reference as if fully set forth herein.

This application is related to U.S. patent application Ser. No. 12/116,158, entitled "TECHNIQUES FOR AUTOMATIC SOFTWARE ERROR DIAGNOSTICS" and filed by Sashikanth Chandrasekaran on May 6, 2008, the entire contents of which is hereby incorporated by reference as if fully set forth herein.

FIELD OF THE INVENTION

The present invention relates to software diagnostics and software error correction. The invention relates more specifically to automatic tracking and recording of software errors, to automatic setting of diagnostic features, and to automatic circumvention of software errors.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A key problem in software systems is how to ensure that the software systems are continuously available. A software system must mask and quickly recover from various failures, such as hardware failures and failures due to errors in the software code itself.

Traditionally, software errors (also known as bugs) in the code of the software system that affect the performance of the software system are classified into "Bohrbugs" and "Heisenbugs". Bohrbugs are 100 percent reproducible—i.e. if the same sequence of operations is executed by the software system, the error will cause a failure again. Usually, software systems have only a few Bohrbugs because most such errors are detected during the testing phase of the software system life-cycle. Heisenbugs, on the other hand, are highly dependant on the timing of various events. They are difficult to reproduce because even if the software system executes the same sequence of operations, the timing of events during the underlying execution of these operations may vary in a way that the error does not affect the performance of the system. Complex multi-threaded software systems, such as operating systems or database systems, usually have many Heisenbugs.

There are some errors, however, which are not 100 percent reproducible but are not very rare either. If the software system executes the same sequence of operations a sufficient number of times, these software errors are bound to cause a failure or affect the performance of the operations. These errors can be classified as an intermediate type of errors, and they are the most common type of errors affecting the performance of the software systems. The reason for the intermediate type errors being most common is that Bohrbugs are found during the beta-testing of the software system. Heisenbugs are annoying, but usually do not cause significant downtime because they are usually corrected by restarting the software system. Moreover, some software systems, such as database systems, have the capability to automatically restore the software system to a consistent state after encountering an error, thus further making Heisenbugs less likely to cause a significant downtime. In fact, if the software system includes several instances running in a cluster, it is possible that a Heisenbug encountered in one instance does not cause any downtime because other instances in the cluster will continue to be available.

The nature of the intermediate type of software errors suggests that the majority of these errors come from code that is newly introduced in the software system. These errors are sufficiently reproducible and by adding one or more diagnostic events, and after sufficient information is collected, a programmer can determine the cause of the error and fix it. Typically, errors of the intermediate type are easy to fix but hard to find. For this reason, many of these intermediate type errors are fixed in software patches or service packs that are released after the software system has been introduced in the market. In contrast, Heisenbugs are hard to find and hard to fix because there may not be a chance to collect the necessary diagnostic information. Heisenbugs may exist in really old code, and some of these Heisenbugs may go unreported by a user because they have caused a software system failure, or have affected the performance of the software system, just one time.

One currently available approach to correcting software errors of the intermediate type involves the participation of one or more software engineers or customer support personnel. When a user of a software system encounters such an error, the user files a Technical Assistance Request (TAR). A system support engineer, usually employed by the vendor of the software system, processes the TAR and determines that either (1) the error is known and has been fixed in a patch or service pack release for the software system, or (2) the error is not known.

The first case, where the error is known and fixed in a patch release, is obviously the simpler case, but even this case is complex and difficult to resolve. Typically, the user has encountered other problems and usually has filed multiple TARs. Thus, multiple software engineers or support personnel may become involved before determining which of the reported problems is the most serious and is causing the software system to fail. After the support personnel determines which error is affecting the software system or is causing the software system to fail, the user has the choice of either upgrading to the existing patch, or waiting for a one-off patch fixing only the reported error to be released. This presents the user with a Hobson's choice because even an upgrade to a patch release is a complex task that may require days of planning. Hence, most of the time, the user has only one realistic option, and it is to apply a one-off patch that is already available or is to be made available for the particular software system. Thus, resolving this case easily takes at least a day, during which time the user may continue to experience software system failures.

The second case, where the user reported a previously unknown error, is even more difficult and time-consuming to resolve. Typically, there are several rounds of interaction between the user that encountered the software error and the software support personnel. In these rounds of interaction, diagnostic event settings are suggested to the user, the user collects the information, and sends this information to the software support personnel. In some cases, it takes several months for the correct diagnostic event settings to be suggested and the information to be collected. There are many errors and omissions in this process, both by the software support personnel and the administrator or administrators at the user site. Educated guesswork is heavily used during this trial and error process. During this time, the user may have suffered significant downtime.

Another currently available approach to resolving intermediate type software errors is to use a separate standby software system that is a mirror of the primary software system. The standby software system could be running an older stable release of the system. The users and applications are failed over to the standby software system when the primary system is unavailable. Since such fail-over represents a significant change for users and applications alike, software systems are switched over in this manner only in the case of major disasters at the primary site or during long periods of planned unavailability (such as during a major upgrade).

Another general approach to resolving intermediate software errors is to use N versions of the same software system where each version is written by a different set of software developers. This technique, called N-version programming, is rarely feasible except for the highest-end systems, because of the cost of developing and maintaining N separate versions of the software system.

All of the currently available approaches for tracking and recording errors affecting the performance of a software system usually involve recording the error information and the system or process state information in Operating System trace files. These trace files are not managed and maintained by a centralized system, such as a database system, and thus in order to track an error through the trace files these files must be correlated manually. Such manual correlation usually requires great skill and expertise on behalf of the support engineer investigating the problem.

Therefore, there is clearly a need for techniques for tracking, diagnosing, and correcting or circumventing software errors that overcome the shortfalls of the approaches described above.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that depicts a technique for automatically tracking software errors.

DETAILED DESCRIPTION

Figure 1:
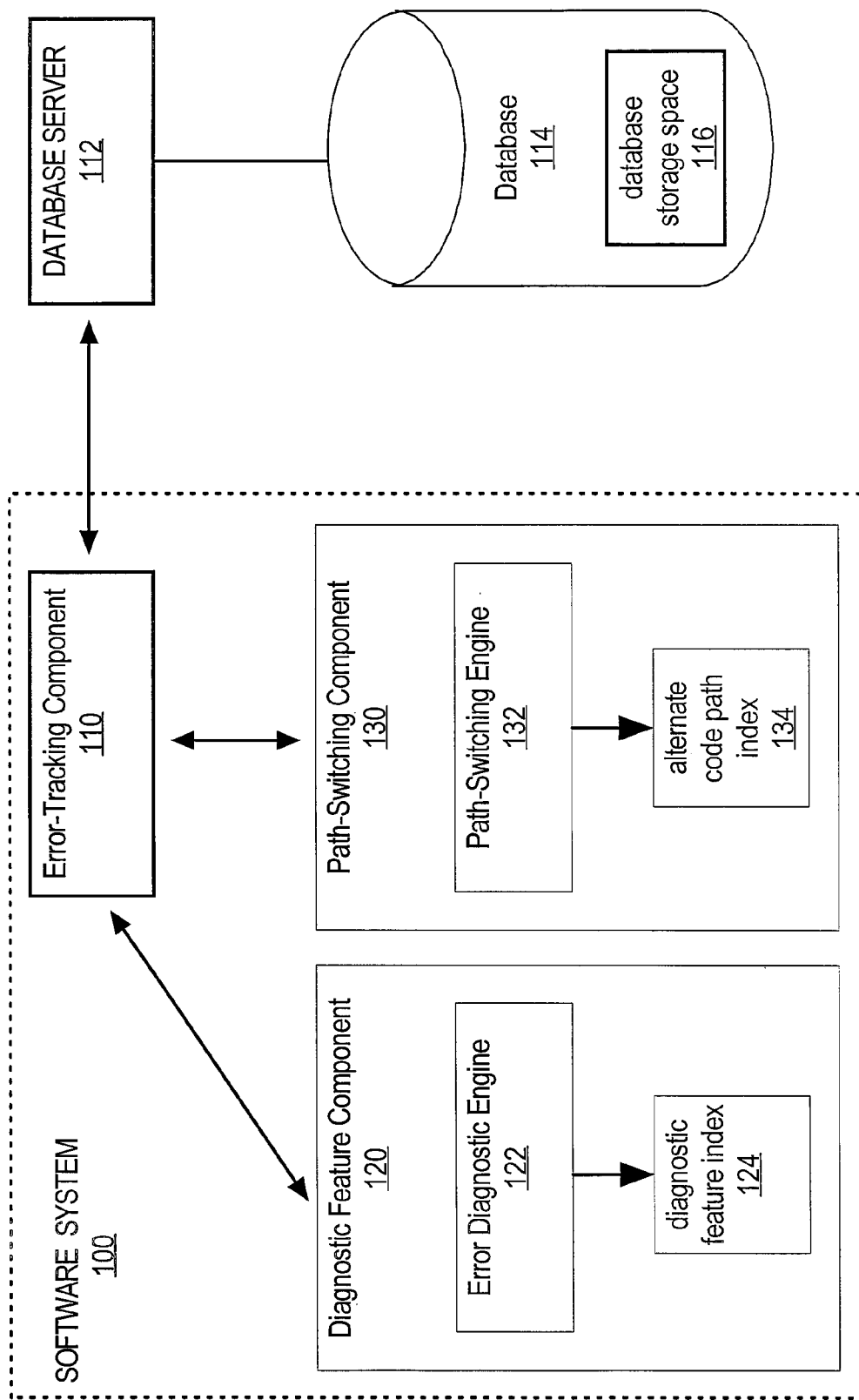
FIG. 1 is a block diagram that depicts a possible software system for performing the techniques for automatically tracking software errors, automatically diagnosing software errors, and automatically circumventing software errors.

Methods and techniques for automatically tracking, diagnosing, and circumventing errors in the code of a software system by the software system itself are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Furthermore, the methods and techniques described herein are in no way limited to any particular embodiment or aspect of an embodiment. An example embodiment of the techniques described herein is implemented on a database system. This example embodiment is described for illustrative purposes only, and the techniques described herein can be implemented by any software system.

Software Error Identification and Categorization

In order for a software system to be able to diagnose and correct a software error within its own code, the software system must be able to uniquely identify and categorize the error with respect to the code path of the software system where the error occurs. Depending on the type of failure that a software error causes, different software systems may use different error identification and categorization schemes. For the purposes of illustration only, described below are three categories and identification schemes of software errors that can be used to implement the techniques described herein.

(a) Errors causing unhandled exceptions raised by the software system. The software system raises an internal exception when it detects an internal inconsistency in data structures or in the programming logic. These exceptions are sometimes called "assertion failures." A unique number or unique string can be used to identify a software error causing such an exception.

(b) Errors causing unhandled exceptions raised by the Operating System (OS) because of faulty execution in the software system code. When the software system is not an Operating System, such unhandled exceptions can be a NULL pointer dereference (segmentation violation) or divide-by-zero arithmetic exception. In this case, the call-stack trace along with the OS exception code can be used to uniquely identify a software error causing such exception.

(c) Errors causing a hang or a perceived hang. As far as a user or another software application is concerned, a request to the software system is hanging or is deadlocked if the user or the other application does not receive a response from the software system within the expected time. In this situation, a software system process or thread is usually waiting for a certain event to occur. The software error (or perceived error) causing a hang can be described using an event name and may be further qualified by event identifiers. The event information and the call stack of the waiting process can determine the location and the condition of the error that is causing the hang. If such error-identifying information does not point directly to the root cause of the problem, it may be because, for example, the event has not occurred because the event itself is waiting on another event. In such situations, it may be necessary to consider, in succession, the event parameters and call stacks of all waiting processes to identify the error.

System Overview

According to an embodiment, a software system can include components to perform the following techniques for:

(1) Automatically tracking errors encountered by the software system;

(2) Automatically diagnosing software errors; and (3) Automatically circumventing errors encountered by the software system.

In this embodiment, a database server is entrusted with the tasks of automatically recording errors and managing error trace information. A separate storage space within a database is provided for storing error information, and the database server allows querying the error information using standard database queries. The software system then automatically determines whether any diagnostic features should be turned on in response to events occurring in the system. The software system determines that certain diagnostic features should be turned on based on logged information about errors that have occurred in the system. After turning on the selected diagnostic features, the software system can automatically log error information upon subsequent occurrences of the errors.

When certain preset conditions have been satisfied, such as, for example, a particular error occurring a predetermined number of times in response to requests to perform a particular operation, the software system automatically determines that the execution code path for executing the operation contains a software error. The software system then automatically switches the execution code path for the particular operation from the current code path to a different code path, where the different code path is selected from a predetermined plurality of code paths that can execute the particular operation. The particular operation can be any operation that the database server can execute, including but not limited to, an operation executed in response to requests from a user, requests from the OS, or requests from processes internal to the database server.

In different embodiments, the software system implementing the techniques described herein can be any software application running on a computer, including but not limited to, an Operating System, an e-mail server, a Web server, a middle-tier application server, a firewall server, and a client-side software application. Furthermore, a software system need not perform all three of the techniques described above. In different embodiments, a software system can perform any of the three techniques separately, can perform any combination of the three techniques, or can perform any of the three techniques in combination with other techniques that may require human intervention.

FIG. 1 is a block diagram that depicts a possible software system for implementing the techniques described herein.

FIG. 1 includes a software system 100 communicatively coupled to a database server 112. The software system 100 comprises an Error-Tracking Component 110, a Diagnostic Feature Component 120, and a Path-Switching Component 130. The Diagnostic Feature Component includes an Error Diagnostic Engine 122 that maintains and makes use of a diagnostic feature index 124. The Path-Switching Component 130 includes a Path-Switching Engine 132 that maintains and makes use of an index of alternate code paths 134.

The Error-Tracking Component 110, the Diagnostic Feature Component 120 and the Path-Switching Component 130 are software components and may be implemented in a variety of ways, including but not limited to, one or more libraries of functions, one or more plug-in modules, and one or more dynamic link-libraries. In execution, the Error-Tracking Component 110, the Diagnostic Feature Component 120 and the Path-Switching Component 130 can be set up in a variety of ways, including but not limited to, one or more separate processes within the address space of the software system 100, one or more threads of the same process within the software system 100, one or more daemons within the software system 100, and one or more services running outside the address space of the software system 100.

Similarly, the Error Diagnostic Engine 122 and the Path-Switching Engine 132 can be implemented in a variety of ways, including but not limited to, one or more libraries of functions, one or more object-oriented classes, and one or more dynamic link libraries. In execution, the Error Diagnostic Engine 122 and the Path-Switching Engine 132 can also be set up in a variety of ways, including but not limited to, one or more separate processes within the address space of the software system 100, and one or more threads of the same process within the software system 100. The diagnostic feature index 124 and the alternate code path index 134 can be implemented as any known data structure, and can be maintained within the software system 100 or in an external repository.

The database server 112 is operatively coupled to, and manages, one or more databases, such as database 114. The database 114 comprises a database storage space 116 that is used to store information about errors detected in the software system 110.

Automatically Tracking Software Errors

1. Storing Error Information in a Database Storage Space

When the occurrence of an error affects the performance of a software system, a database server is entrusted with the tasks of automatically recording error information, and with saving and managing error trace information. A separate storage area is allocated to save the error information, which can be in a compressed format. In an embodiment, a software system detects the occurrence of an error that affects the performance of an operation by the software system. In response to detecting the occurrence of an error, the software system automatically records error information about the error in a storage space within a database that is managed by a database server. In a different embodiment, the software system is a database server, and the occurrence of an error is detected by the database server itself.

In an embodiment, the database server allocates the error information storage space based on configuration information received from a user, where the configuration information specifies the location and size of the storage space. Preferably, the storage space is organized as a separate database. In an embodiment, the storage space is organized as a circular buffer. The database server that is entrusted with keeping track of errors determines whether the storage space is filled up, and if it is, then the database server automatically records the error information about the current error over the oldest error information existing in the storage space. In one embodiment, the database server stores error information about every error that occurs within the database server; in a different embodiment, the database server stores error information only about errors that have not been encountered before, and does not store error information about errors for which error information has already been stored within a preset preceding interval of time.

2. Storing and Retrieving Error Information

The database server entrusted with automatic record-keeping of error information can further determine the type of the error it has encountered, and based on the type of error, it can select what error information to store in the storage space. Depending on the type and category of the error, the database server may store, for example, the value of a parameter that is maintained by the database server itself, the value of a parameter maintained by the OS, or the value of a parameter associated with a network connection. In general, the error information will vary depending on the type of the error. Specific examples of such parameters include, but are not limited to, the number of users connected to the database server at the time of the error, the memory usage at the time of the error, the operating system load at the time of the error, the number of network connections at the time of the error with their respective network protocols, the number of retransmitted packets by the network subsystem at the time of the error, and the number of dropped packets by the network subsystem at the time of the error.

Automatically recording error information can be performed by executing one or more computer instructions in a code path that is separate from the code path that is used for storing user data within a database. Preferably, this separate code path is simple and thoroughly tested in order to virtually eliminate the possibility that software errors within this separate code path will affect the performance of an operation by the database server. This separate code path can be executed in a logger daemon process that is the last process to terminate after all other database server processes have unexpectedly terminated in order to ensure that any and all generated errors will be recorded. In a different embodiment, the separate code path can be dedicated only to automatic recording of error information.

In one embodiment, the database server can receive a database command that requests retrieval of error information from the storage space. The database command can be issued from a user or from a software application. The database server then executes the database command to retrieve the error information from the storage space and returns the error information to the requester. The database command can be any command that can be performed by the database server, including but not limited to, a Structured Query Language (SQL) command.

For example, the error information in the storage space may include meta-data about the errors that are recorded. Using a SQL command, a user can query the meta-data to determine all errors generated in the last 24 hours. The database command can also be a command to export to regular operation system files the error information that is saved in the database storage space. This will allow a user to use any OS utilities, such as the UNIX grep utility, to scan the error information, and to use any popular editors, such as the UNIX vi editor, to view the error information.

3. Functional Overview

FIG. 2 depicts a technique for automatically tracking errors that occur in a software system. In this embodiment, in step 200, the software system automatically detects the occurrence of an error that affects an operation performed by the software system. If the error has not previously being detected by the software system within a preset interval of time, then, in step 205, the software system automatically determines that information about the error must be recorded in a database storage space. In step 215, the relevant error information is automatically recorded in a storage space in a database that is managed by a database server. If the error has previously been detected within a preset interval of time, the software system decides in step 205 that information about the error need not be recorded. The software system then, in step 210, disregards the occurrence of the error, and continues to automatically detect the occurrences of other errors.

Automatically Diagnosing Software Errors

1. Determining Whether Diagnostic Features Should be Set

In one embodiment, a software system automatically determines whether some conditions associated with the software system warrant the use of any diagnostic features that are not currently enabled. The software system can perform this determination in response to detecting the occurrence of an error in the system. The conditions that warrant the use of a diagnostic feature include, but are not limited to, the severity of an encountered error, the number of times a particular error is encountered within a preset time interval, and a particular event occurring concurrently with the error. A specific example of conditions warranting use of a diagnostic feature would be the same error occurring at approximately the same time of the day for three consecutive days.

In another embodiment, the software system logs information about errors as they occur in the software system, and then uses information about errors that have previously occurred to automatically determine whether conditions warranting use of any diagnostic features exist. The software system can log the information in a log trace file, or can log the information in a database storage space managed by a database server, as previously described. For example, the software system can log information about aborted transactions on a recurring basis. Once the number of aborted transactions exceeds a predetermined threshold, the software system looks at all the aborted transaction error information to determine whether the majority of the aborted transactions originated from the same user or the same user connection. If the that is in fact the case, the software system then automatically determines that additional diagnostic features must be turned on to monitor the specific user or user connection that initiated the majority of the aborted transactions.

2. Enabling the Selected Diagnostic Features

If the software system determines that conditions warranting the use of diagnostic features exist, then the software system determines which feature or features of a plurality of diagnostic features should be enabled. Thereafter, the software system automatically enables the selected diagnostic features.

Once the selected diagnostic features have been turned on, the software system can automatically record the diagnostic information as determined by the diagnostic features. If the software system automatically enabled one or more diagnostic features in response to the detection of an error, the software system can then gather the required error information during any subsequent occurrences of the same error by automatically recording the error information, as described above. The error information, as described above, can include not only information about the error itself, but also any information that can be useful in debugging the problem.

Once the diagnostic features have been enabled, the software system may be configured to detect whether conditions for disabling the features have been satisfied. If the software system determines that existing conditions warrant disabling the selected diagnostic features, then the software system can automatically disable these features. The conditions warranting disabling one or more diagnostic features can simply be a determination that enough error information has been collected because, for example, a preset number of occurrences of a particular error have been recorded.

3. Keeping an Index of the Available Diagnostic Features

The software system maintains an index of available diagnostic features where the index has a key based on information about errors. The index entries indicate which diagnostic feature or features need to be enabled in response to error information satisfying the conditions warranting the use of diagnostic features.

The information in the index, along with the index key values and the index entries can be kept in a repository external to the software system. Keeping the index information in an external repository allows for more flexibility since it allows a user or administrator to change from time to time the diagnostic features that must be automatically turned on in response to encountering the occurrence of a particular error. The information in the index can also be hard-coded, i.e. the information contained in the index may be dictated by information specified in the source code that was compiled to create the executable code of the software system. If the index is hard-coded within the software system, the error information on which the index key values are based can be kept consistent with any modifications that are made to the code of the software system from one release to another. For example, if a new diagnostic feature is added to the code of the software system, then corresponding index entries can be added to the index, and can be associated with one or more index key values, thus keeping diagnostic features consistent with the changes to the software system code.

The index may be implemented in any one of a variety of ways, including, but not limited to, a relational table, a hash table, an object-oriented class where the class properties are the index entries and the class methods are used to search the index, and a hierarchy where the index keys are arranged in a hierarchical order. In response to the occurrence of a particular error, the software system performs a look-up in the index based on error information, to locate one or more index entries that indicate which diagnostic feature or features should be enabled. In different embodiments, the index can maintain an entry for every unique error, or the index can maintain a unique entry only for every unique software component that may be the source of an error.

4. Looking Up Diagnostic Features in a Hierarchical Index

In an embodiment, the index is organized as a hierarchical index, and the index key includes a plurality of key-parts. The number of the key-parts in the index key is based on the information that is recorded for a particular error. For example, for an error that causes an unhandled exception, the index key can include a key-part corresponding to the name of the software component where the error occurs, a key-part corresponding to the name of the particular module where the error occurs, and a key part corresponding to the specific error number. For an error that causes a hang or a perceived hang, the index key can include a key-part corresponding to the event name, and one or more key-parts corresponding to particular event parameters.

In this embodiment, a hierarchical search can be used to determine the closest match between the hierarchical key value for the error that occurred and the hierarchical key values for the entries within the index. Initially, a set of search values is established to include all the error information values associated with all the key-parts of the index key. The look-up is performed by progressively relaxing the search through eliminating, from this search set, values associated with key-parts until: (1) a match is found between the set of search values remaining and the values of the corresponding index key-parts, or (2) there are no values left in the set of search values. If a match is found, then the index entry associated with the matched index key entry (as determined by the key-part values) determines which diagnostic feature or features need to be enabled.

For example, an error causing some failure in, or affecting the performance of, the software system can be identified as "cache.io.2103". In this example, the index key will include three key-parts: a key-part corresponding to the name of the software component where the error occurs, a key-part corresponding to the name of the particular module where the error occurs, and a key part corresponding to the specific error number. Thus, an index key entry for this error, if it exists, will include "cache" as the software component, "io" as the module, and "2103" as the specific error number. The look-up of which diagnostic feature or features need to be enabled in response to the occurrence of this error will include the following steps:

initially establishing the set of search values to be {"cache", "io", "2103"};

(a) attempting to find a matching index key entry, based on all values included in the set (for example, in the first iteration of this step, this means to find an index key entry where the software component key-part value matches "cache", the module key-part value matches "io", and the specific error key-part value matches "2103"; in the second iteration of this step, this means to find an index key entry where the software component key-part value matches "cache", and the module key-part value matches "io"; and in the third iteration of this step, this means to find an index key entry where the software component key-part value matches "cache");

(b) if a matching index key entry is found, then determining which diagnostic feature or features need to be enabled based on the index entry corresponding to the matched index key entry;

(c) if a matching index key entry is not found, then removing a value from the set of search values (for example, in the first iteration of this step, this means to remove "2103"; in the second iteration of this step, this means to remove "io"; and in the third iteration of this step, this means to remove "cache"); and repeating steps (a), (b), and (c) until a matching index key entry is found, or until there are no values left in the set of search values.

In other words, the software system would first check if there is an index key entry matching to "cache.io.2103", i.e. whether any diagnostic feature or features need to be enabled for the specific error "2103". If such index key entry is found, the software system will enable the diagnostic feature or features for the specific error "2103". If no such entry exists in the index key, the software system would check if there is an index key entry matching to "cache.io". If such index key entry is found, the software system will enable the diagnostic feature or features for the "io" module in the "cache" software component. If no such entry exists in the index key, the software system would check if there is an index key entry matching to "cache". If such index key entry is found, the software system will enable the diagnostic feature or features for the "cache" software component. If no such entry exists in the index key, the software system will determine that no diagnostic feature needs to be enabled in response to the occurrence of the error identified by "cache.io.2103".

The key-parts of the index key can be ordered in a particular order. For example, in the embodiment described above the highest-ordered key-part corresponds to general components of the software system, and the lowest-ordered component corresponds to specific errors that can be encountered in the software system. The step of removing a value from the set of search values is performed by removing the value associated with the lowest ordered key-part that has not yet been removed from the search set. However, there is no particular requirement that the key-parts of an index be ordered in this manner. In different embodiments, the index key-parts can be arranged differently on the basis of different criteria, and the traversing of the index can be performed according to the arrangement and the ordering criteria.

5. Functional Overview

Figure 3A:
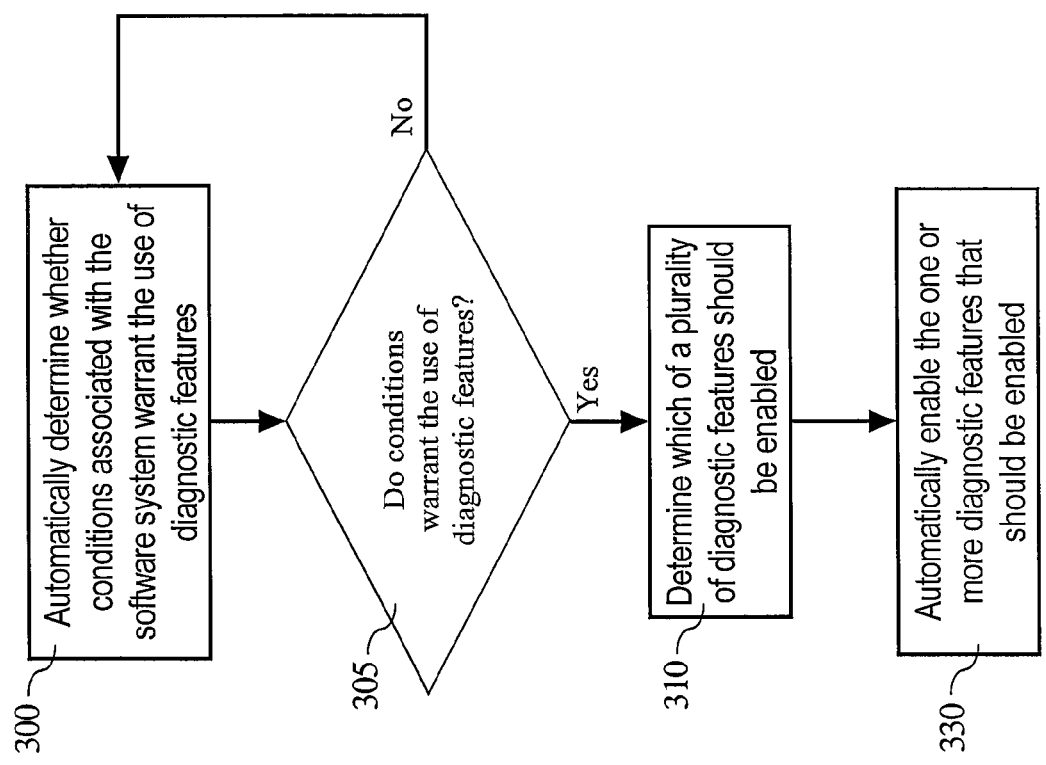
FIG. 3A is a flow diagram that depicts a technique for automatically diagnosing errors encountered in a software system.
Figure 3B:
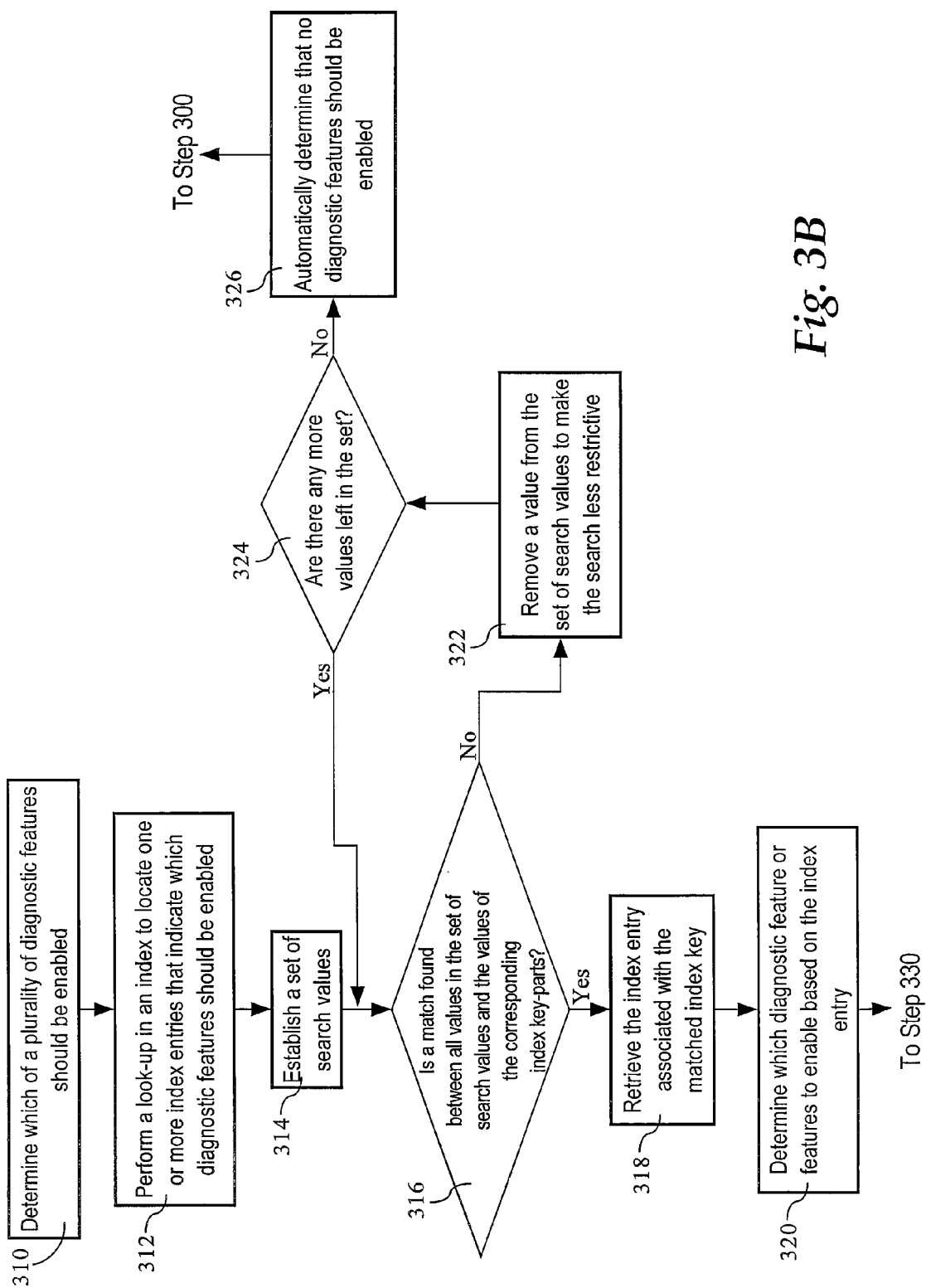
FIG. 3B is a flow diagram that depicts a technique for determining which of a plurality of diagnostic features should be enabled.

FIG. 3A combined with FIG. 3B depict a technique for automatically diagnosing errors in a software system.

In step 300, the software system automatically determines whether conditions associated with the system warrant the use of any diagnostic features that are not currently enabled. If conditions that warrant the use of one or more diagnostic features do not exist, then, in step 305, the software system automatically determines that it does not need to automatically enable any additional diagnostic features; the software system then proceeds to step 300 to continue monitoring whether any additional diagnostic features should be enabled. If conditions that warrant the use of one or more diagnostic features do exist, then, in step 305, the software system automatically determines that one or mode diagnostic features must be enabled. In step 310, the software system automatically determines which diagnostic features, of a plurality of diagnostic features, should be enabled, and in step 330 the software system automatically enables the diagnostic features selected in step 310.

FIG. 3B is a blown-up flow diagram that depicts a technique for performing step 310. To determine which of a plurality of diagnostic features should be enabled, in step 312 the software system performs a look-up in an index that has a key, where the index key has a plurality of key-parts and is based on information about errors. The software system performs the look-up to find an index entry indicating which diagnostic features should be enabled in response to the occurrence of an error in the software system. In step 314, the software system establishes an initial set of search values to include values corresponding to all key-parts of the index key. In step 316 the software system attempts to find a match between all values in the set of search values and the values of the corresponding index key-parts of the index key. If in step 316 a match is found, then in step 318 the software system retrieves the index entry associated with matched index key, and in step 320 the software system selects which diagnostic feature or features to enable based on the index entry. The software system then proceeds to step 330 (shown in FIG. 3A) to enable these selected diagnostics features.

An example of a useful diagnostic feature that can be enabled in this manner is one where the software system records trace information to help determine the code path that is being executed. This may include recording important functions and their parameters, printing messages when infrequent conditions are encountered in program logic, or printing dumps of important data structures at various points in the code. Other diagnostic features in a software system can also be enabled in the manner described above, including, but not limited to, CPU utilization for one or more processors, memory utilization of logical and physical memory, network throughput, disk Input/Output (I/O) utilization, number of user connections established by the software system within an interval of time, number of user connections dropped by the software system within an interval of time, committed transactions per second, event message log utilization, error log utilization, number of open file descriptors, number of unhandled exceptions occurring within the system, number of locks to resources granted by the software system, and number of deadlocks detected within the system.

If in step 316 a match is not found, then in step 322 the software system removes a value from the set of search values in order to make the search less restrictive. In step 324 the software system checks to determine whether there are any values left in the set of search values. If in step 324 the software system determines that there are one or more values left in the set of search values, the software system then proceeds to again perform step 316. If in step 324 the software system determines that there are no more values left in the set of search values, then in step 326 the software system automatically determines that no diagnostic features should be enabled. The software system then proceeds to step 300 (shown in FIG. 3A) to continue monitoring whether any additional diagnostic features should be enabled.

Automatically Circumventing Errors in a Software System

1. Overview

When an error is encountered by a software system, the software system first keeps a persistent record of the error information as described above in the section "Automatic record-keeping of errors". If diagnostic features related to a particular error are available, the software system automatically enables these diagnostic features as described above in the section "Automatic Setting of Diagnostic Features", and proceeds to collect more error information upon any subsequent occurrence of the error. While the two techniques described above will, by themselves, provide for a faster resolution of a problem caused by an error in code of the software system, the techniques cannot by themselves prevent any subsequent occurrence of the error in the software system. This section describes a technique where the software system automatically switches the execution of an operation from one code path to one of a plurality of alternate code paths, if they exist, when certain conditions are satisfied in the software system.

The code of a software system is usually replete with alternate code paths that can execute the same operation. This situation is not analogous to redundancy in hardware because in hardware the redundant parts are usually identical. In software, however, the alternate code paths may have different algorithms, different timing sequences, and different performance characteristics. Alternate code paths in software systems evolve not necessarily for providing redundancy, but as a result of optimizations developed in newer releases.

Methods and techniques for automatically circumventing errors in a software system by switching to alternate code paths are described herein. A plurality of distinct code paths for performing a particular operation is included in the code of the software system. Initially, one of these code paths is established as the execution code path for the particular operation, and the software system executes this execution code path in response to requests to perform the particular operation. The software system then automatically determines whether path-switching conditions have been satisfied. If path-switching conditions have been satisfied, then the software system automatically establishes a different code path from the plurality of distinct code paths, as the code path that is executed in response to any requests to perform the particular operation.

A uniform mechanism is established to facilitate the automatic switching of execution code paths. In one embodiment, branch points in the software system code are used to identify the different code paths for performing a particular operation.

The branch points partition the software system code into distinct call graphs. Each branch point is associated with a separate parameter. The parameter can be declared in the software system code as global or local variable, and can hold a value of any available data type, including but not limited to, a numeric value, a string value, or a date. The value of the parameter indicates which code path, of the available code paths, must be executed by the software system in response to a request to perform a particular operation. The software system can then facilitate a switch-over to a different code path by simply changing the value of the parameter. In a different embodiment, the uniform mechanism for switching is represented by an ordered list of parameters. Each parameter is associated with a separate code path. The order of the parameters in the list determines the order in which the software system executes the code paths specified by the parameters in response to a request to perform the particular operation. The software system switches code paths by replacing a parameter in the list with a parameter associated with a different code path.

The particular operation described herein can be any operation that can be performed by the software system, including but not limited to, an operation performed in response to requests from a user, in response to requests from another software application, and in response to requests from a process or thread within the software system. The software system can be any system running on a computer, including but not limited to, an Operating System, a database server or system, an e-mail server, a middle-tier application server, a Web server, and any client-side software application.

2. Exploring Alternate Code Paths

In an embodiment, the software system automatically determines whether path-switching conditions have been satisfied by automatically recording information about one or more errors in response to the occurrence of these errors when the software system performs a particular operation. The software system then determines whether the occurrence of the one or more errors exceeds preset threshold criteria. An example of such criteria can simply be that a particular error has occurred more than N times in the software system. The threshold criteria, however, is not limited to just counting the number of error occurrences and can depend on the nature of the error, and can include any criteria which are used to evaluate the performance of the software system. Examples of such criteria include, but are not limited to, Central Processing Unit (CPU) utilization, memory utilization, Input/Output throughput, and network throughput. If the software system determines that the preset threshold criteria have been exceeded, the software system then automatically determines that path-switching conditions have been satisfied, and proceeds to switch-over the execution of the particular operation to a different code path.

In an embodiment, the software system operates in two path-switching modes. In the first mode, the software system executes a predetermined code path (the execution code path) in response to a request to perform a particular operation. In this mode, the software system uses a first set of path-switching conditions to determine whether a switch-over to a different code path for performing the particular operation is warranted. However, once the first set of path-switching conditions has been satisfied and a different code path has been established to execute the particular operation, the software system automatically switches to the second mode. In the second mode, the software system uses a second set of path-switching conditions to determine whether to continue executing the new different code path in response to requests to perform the particular operation. The path-switching conditions in the second set are generally easier to satisfy than the path-switching conditions in the first set. For example, the second set of path-switching conditions may be satisfied if a single error is encountered during the execution of the new different code path. If the second set of path-switching conditions has been satisfied, the software system then switches execution to a third code path that is different from the code paths that have been explored so far. If a predetermined amount of time passes after the software system has switched to the second mode without the second set of path-switching conditions been satisfied, then the software system switches back to the first mode where it uses the first set of path-switching conditions, but continues to use the new different code path to perform the particular operation.

In a different embodiment, the software system uses the same path-switching conditions in the first and the second mode. Whether to select the same or different path-switching conditions depends on the nature of the error. If the encountered error is in a critical code path of the software system, then the same relatively less stringent path-switching conditions will be used to facilitate a faster search for a stable error-free path. If the encountered error is not so critical and if its occurrence can be tolerated, then, in order to avoid excessive code path switching, the first set of path-switching conditions may be more stringent (for example, by requiring that the error is encountered multiple times before switching), while the second set of path-switching conditions may be less stringent (for example, by requiring that the code path is switched when any error is encountered).

3. Traversing an Index of Alternate Code Paths

In an embodiment, the software system maintains a code path index of available code paths for performing particular operations. The code-path index is similar to the index, described above, for identifying which diagnostic features to enable. The code path index has a key based on information about errors. The index entries indicate which code paths, of a plurality of distinct code paths for performing the particular operation, can be executed in response to the path-switching conditions being satisfied.

The information in the code path index, along with the index key values and the index entries, can be kept in a repository external to the software system. The information in the index can also be hard-coded, i.e. the information contained in the index is dictated by information specified in the source code that was compiled to create the executable code of the software system.

The code path index may be implemented in any of a variety of ways, including, but not limited to, a relational table, a hash table, an object-oriented class where the properties of the class are the index entries and the class methods are used to search the index entries, and a hierarchy with a hierarchically-arranged index keys. The software system performs a look-up in the index to locate one or more index entries that indicate which code path of the plurality of available code paths should be selected as the code path to execute the particular operation. In different embodiments, the index can maintain an entry for every unique error, or the index can maintain a unique entry only for every unique software component that contains the error.

In an embodiment, the code path index is organized similarly to the index of diagnostic features described above in the "Automatic setting of diagnostic features" section. The code path index is organized as a hierarchical index, and the index key includes a plurality of key-parts. The number of the key-parts in the index key is based on the information that is recorded for a particular error. For example, the index key can include a key-part corresponding to the name of the software component where an error occurs, a key-part corresponding to the name of the particular module where the error occurs, and a key part corresponding to the specific error number.

In this embodiment, a hierarchical search similar to the search described above with respect to the index of diagnostic features is used. The hierarchical search determines the closest match between information about a particular error and the value of an index key. Initially, a set of search values is established to include all the values associated with all the key-parts of the index key. The look-up is performed by progressively relaxing the search through eliminating from this search set values associated with key-parts until: (1) a match is found between the search values remaining in the set and the values of the corresponding index key-parts, or (2) there are no values left in the set of search values. If a match is found, then the index entry associated with the matched index key entry (as determined by the key-part values) determines which code path from the plurality of distinct code paths available is to be selected as the execution code path for the particular operation. In other words, if all alternate code paths, indicated in a level of the index, for performing the particular operation have been tried and an error is still encountered by the software system, the software system moves to the next higher level in the hierarchy and explores the alternate paths at that level.

For example, an error causing some failure in, or affecting the performance of, the software system can be identified as "cache.io.2103". In this example, the index key will include three key-parts: a key-part corresponding to the name of the software component where the error occurs, a key-part corresponding to the name of the particular module where the error occurs, and a key part corresponding to the specific error number. Thus, an index key entry for this error, if it exists, will include "cache" as the software component, "io" as the module, and "2103" as the specific error number.

In other words, the software system would first check if there is an index key entry matching to "cache.io.2103", i.e. whether there are any alternate code paths for performing the particular operation that can be executed in response to encountering the specific error "2103". If no such entry exists in the index key, the software system would check if there is an index key entry matching to "cache.io". If such index key entry is found, the software system will explore any alternate code paths in the "cache.io" module. If the software system explores all alternative code paths in the "cache.io" component and still fails to circumvent the "2103" error, the software system would check if there is an index key entry matching to "cache". If such entry is found, the software system will then explore all alternative code paths for the "cache" software component.

In one embodiment, if all alternate code paths within the highest-level software component specified in the index also fail to circumvent the particular error, the software system will determine which software component invoked this highest-level software component by checking the call stack. In this embodiment, it is possible to uniquely identify which component invoked the highest-level component specified in the index because every exception handler in the software system records its component name. Once the component is identified, the software system will then check if there is an index key entry that matches to the name of this component, and will explore all alternate code paths specified by the corresponding index entry.

In one embodiment, the key-parts of the index key can be ordered in a particular order. For example, the highest-ordered key-part can correspond to general components of the software system, and the lowest-ordered component can correspond to specific errors that are encountered in the software system. The step of removing a value from the set of search values is performed by removing the value associated with the lowest ordered key-part that has not yet been removed from the search set. In a different embodiment, the software system may keep a parameter indicating the maximum number of alternate code paths that can be explored before the traversal of the index is terminated. Setting this parameter to 0 will completely disable exploring of alternate code paths.

4. Automatically Switching to Alterante Code Paths

In one embodiment, a particular operation is associated with a parameter, and a distinct value of the parameter is associated with each code path of the plurality of code paths for performing the particular operation. The software system automatically switches from the current execution code path to a different code path by automatically changing the value of the parameter from the value associated with the current execution code path to the value of the parameter associated with the new different code path.

In an embodiment, a sequence is associated with the plurality of code paths for executing a particular operation. During the switch-over, the software system automatically switches the execution of the particular operation from the current code path to the code path which immediately follows it in the sequence. In a different embodiment, the sequence is based on the probability that an error will be encountered when the software system executes a code path from the plurality of code paths in response to a request to perform the particular operation. In yet a different embodiment, the sequence in which alternate code paths are selected is based on minimum deviation from the original execution code path.

5. Timing and Scope of Switching to Alternate Code Paths

After the software system has determined that path-switching conditions have been satisfied and has selected an alternative code path to perform a particular operation, the software system changes the value of the parameter to the value associated with the new different code path. In one embodiment, the parameter is a run-time parameter, and the setting of its value takes effect immediately. Any subsequent requests to perform the particular operation are performed by executing the newly selected different code path. In another embodiment, the parameter is not run-time, and the change of its value takes effect upon restarting the software system. Whether to make the parameter a run-time parameter depends on whether the correct execution of the particular operation can be guaranteed without affecting other processes or threads that may still be in the process of executing the original execution code path.

In one embodiment, when the software system automatically changes the value of a parameter to indicate a switch from the current execution code path to a different code path of the plurality of code paths for performing a particular operation, the change of code paths applies only to the process or thread for which path-switching condition have been satisfied while executing the particular operation. In a different embodiment, when the software system changes the value of a parameter to facilitate a code path switch, the new code path selected as the execution code path for the particular operation is established as the code path for executing the particular operation for all subsequent requests to perform the particular operation by all processes or threads of the software system which can execute the particular operation.

In an embodiment, a software system comprises a plurality of instances running in a cluster, that is, a plurality of virtually identical copies of the software system executable code run on one or more hardware platforms. In this embodiment, the same code path is the current execution code path performed by each instance in the cluster in response to requests for performing a particular operation. When one instance of the software system establishes a different code path for performing the particular operation, the new different code path is established as the execution code path for performing the operation on every software system instance in the cluster.

6. Code Path Switching in Multi-Threaded Code with Shared State

Some software systems are designed to support a plurality of threads. In execution, the threads usually run concurrently and share the same process state. The software system maintains a data structure in memory that is shared by the plurality of threads. The shared memory data structure may include one or more shared parameters. All the threads of the plurality of threads usually have the same rights to read and modify the value of a shared parameter.

In multi-threaded software systems, although an error may be encountered during the execution of a particular operation by a first thread, the root cause of the problem may be an incorrect execution of the same or different operation in a second thread. The reason for this is that the error encountered by the first thread may be because of a change to the value of a shared parameter by the second thread. Thus, in order for a multi-threaded software system to effectively circumvent software errors encountered during the execution of the threads, it is necessary to explore alternate code paths not only in the thread that reported the error, but also in the thread that was the last modifier of the value of a shared parameter.

In order to track the last modifier of the shared state, important shared data structures include a last-modifier field that is set to the thread-id of the thread that modifies the value of a parameter included in the data structure. When a first thread executing a particular operation encounters an error due to an inconsistency in the shared data structure, the first thread records, along with the rest of the error information, the thread-id of a second thread (the thread that last modified the shared data structure). The software system will first explore alternate code paths for the particular operation executed by the first thread. If the error is persistently encountered, the software system will then mark the second thread as suspect, and will investigate alternate code paths for the operation executed by the second thread.

In one embodiment, a software system is a multi-threaded system with a plurality of threads, which, in execution, share a data structure in memory. A first thread of the software system performs a first operation by executing a first execution code path, of a plurality of distinct code paths for performing the operation, in response to a request to perform the first operation. The software system further includes a plurality of distinct code paths for performing a second operation, and a second thread executes a second execution code path of the plurality of code paths for the second operation in response to a request to perform the second operation. When the second thread modifies data in the shared data structure, information about the second thread is automatically recorded in the data structure. Based at least in part on this recorded information, the software system automatically determines whether it is warranted to switch from the second execution path for the second operation to another code path of the plurality of code paths for the second operation, in response to the first thread encountering an error while executing the first execution code path for performing the first operation. If the software system determines that switching the second execution path for the second operation is warranted, the software system then selects an alternate code path from the plurality of code paths for performing the second operation. In this example, the first and second operations may either be the same type of operation, or different types of operation.

In an embodiment, the software system automatically determines whether it is warranted to switch the second execution path for the second operation based on determining that the second thread modified data in the shared data structure immediately before the first thread encountered the error. In a different embodiment, the software system automatically determines whether it is warranted to switch the second execution path for the second operation based on determining that the second thread modified the value of the parameter in the shared data structure immediately before the first thread read the data.

In an embodiment, the software system first determines if all alternate code paths of the plurality of code paths for the first operation have been explored. If the software system determines that all alternate code paths for the first operation have previously been explored and the first thread still encounters an error, then the software system determines that it is warranted to mark the second thread as suspect and to explore alternate code paths from the plurality of code paths for the second operation. The software system makes these determinations based on error information which was recorded by the first thread and which includes an identifier of the second thread.

7. Selecting Alternate Code Paths During Regression Testing

In one embodiment, the software system is tested to determine whether there are any software errors. In this embodiment, when path-switching conditions are satisfied, the software system randomly establishes a different code path of a plurality of distinct code paths for performing a particular operation. Such random selection of alternate code paths has at least two benefits: (1) it ensures that all alternate code paths are well tested and that the combinations of alternate code paths across different software components work together, and (2) it improves the usefulness of old tests which have previously been written to test a particular operation by providing different execution sequences and by increasing the overall code coverage of a single test.

8. Functional Overview

Figure 4:
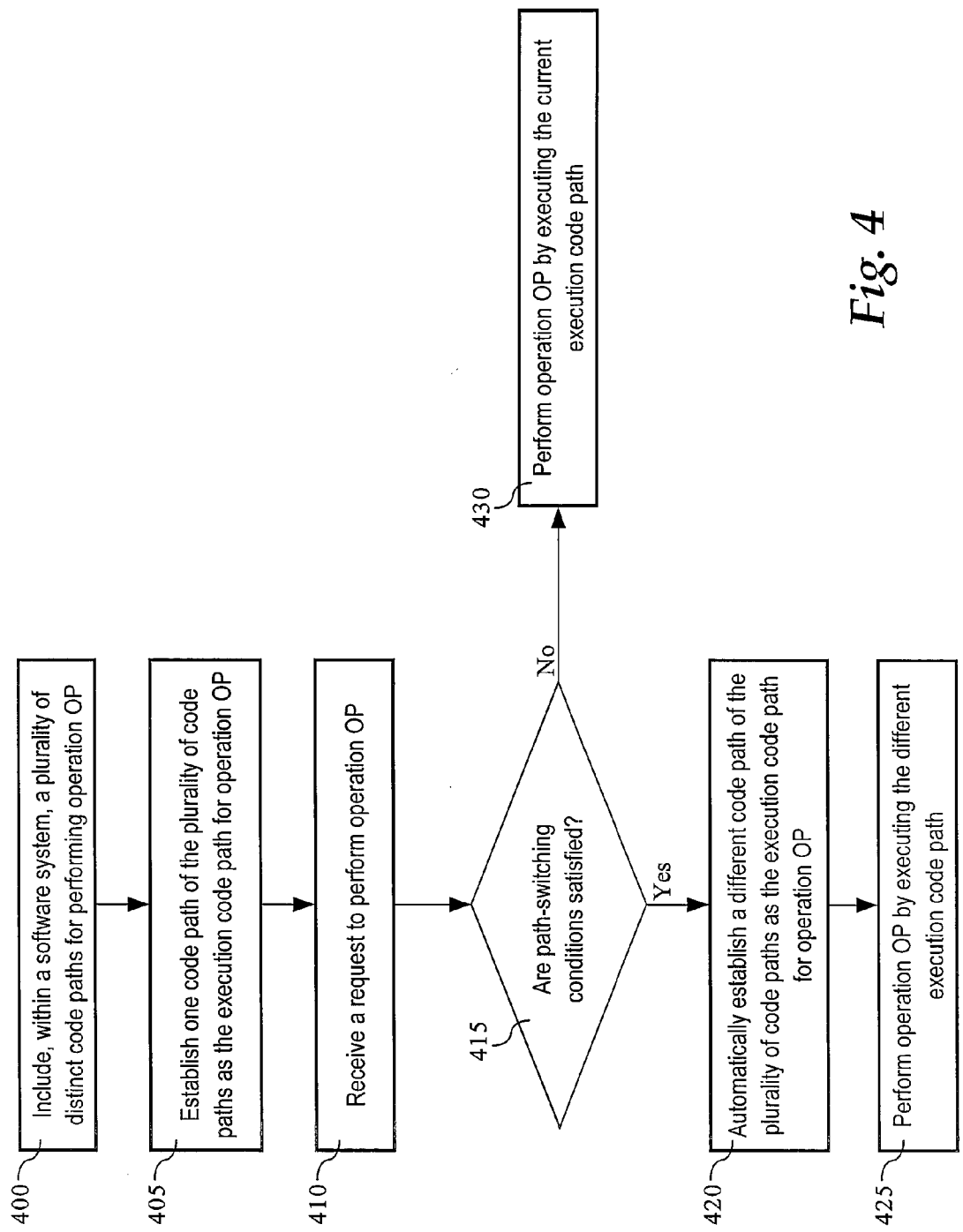
FIG. 4 is a flow diagram that depicts a technique for automatically circumventing software errors encountered in a software system.

FIG. 4 depicts a technique for automatically circumventing software errors encountered by a software system.

In step 400, a plurality of distinct code paths for performing a particular operation (herein named "OP") is included in the software system. In step 405, one of this plurality of distinct code paths is established as the execution code path for operation OP, where this execution code path is executed by the software system in response to requests to perform operation OP. In step 410 the software system receives a request to perform operation OP. In step 415, the software system automatically determines whether conditions warranting the switching of the current execution code path for operation OP are satisfied. If in step 415 the software system determines that such path-switching conditions are not satisfied, then, in step 430, the software system performs operation OP by executing the current execution code path. If in step 415 the software system automatically determines that path-switching conditions are satisfied, then, in step 420, the software system automatically establishes a different code path for performing operation OP, where the different code path is selected from the plurality of distinct code paths for operation OP and is different than the current execution code path. In step 425, the software system performs operation OP by executing the different code path.

Hardware Overview

Figure 5:
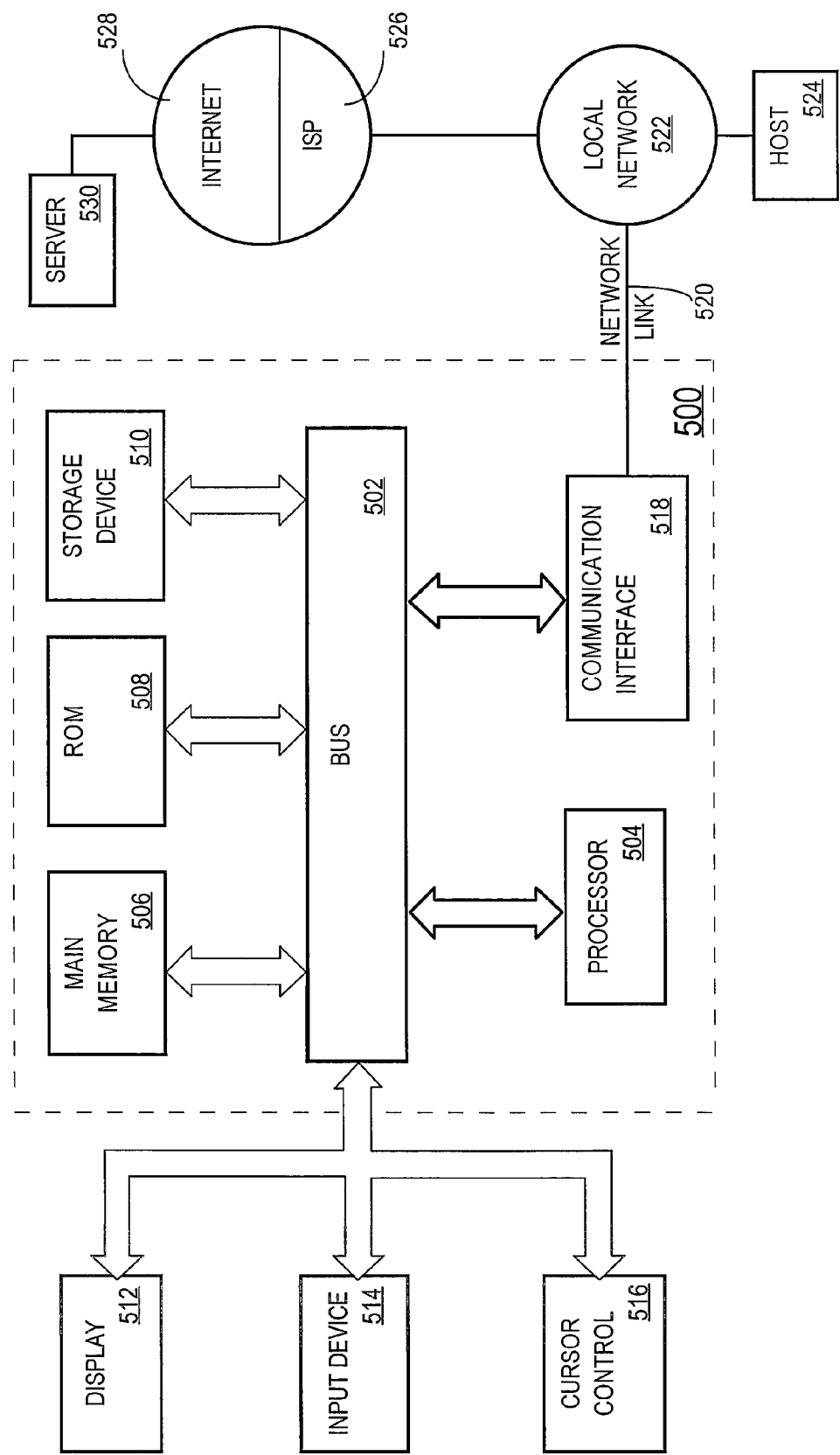
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for automatically keeping track of software errors, the method comprising the computer-implemented steps of:
   detecting an occurrence of an error that affects performance of an operation being performed by a database server; and
   in response to detecting the occurrence, automatically recording error information about the error in a storage space within a database that is managed by the database server;
   wherein the step of automatically recording the error information is performed by executing one or more computer instructions in a first code path, of the database server;
   wherein the first code path is a separate code path than a second code path of the database server, that is used to store user data within the database;
   wherein the steps of the method are performed by one or more computing devices on which the database server is executing.

2. The method of claim 1, wherein the step of automatically recording is performed by the database server.

3. The method of claim 1, wherein the step of automatically recording includes:
   determining whether the storage space is filled up; and
   if the storage space is filled up, then automatically recording the error information over the oldest error information existing in the storage space.

4. The method of claim 1, wherein the first code path is a code path dedicated to automatically recording the error information.

5. The method of claim 1, wherein the method further comprises the steps of:
   determining what type of error occurred; and
   selecting which type of error information to store in the storage space based on the type of error that occurred.

6. The method of claim 5, wherein the type of error information selected to be stored in the storage space includes at least one of a value of a parameter maintained by the database server, a value of a parameter maintained by an operating system, and a value of a parameter associated with a network connection.

7. The method of claim 1, further comprising the steps of:
   receiving, from a user, a database command that requests retrieval of the error information from the storage space;
   the database server executing the database command to retrieve the error information from the storage space; and
   returning the error information to the user.

8. The method of claim 7, wherein the database command is a Structured Query Language (SQL) command.

9. The method of claim 1, further comprising the step of receiving configuration information from a user, wherein the configuration information determines a location and a size of the storage space.

10. The method of claim 1, wherein the step of automatically recording the error information comprises the steps of:
    determining whether errors have previously been detected; and
    recording error information only about errors that have not previously been detected.

11. The method of claim 10, wherein the step of determining whether the errors have previously been detected comprises determining that the errors have not been encountered within a preset interval of time.

12. A non-transitory computer-readable storage medium storing one or more sequences of instructions for automatically keeping track of software errors, which instructions, when executed by one or more processors, cause the one or more processors to perform steps comprising:
    detecting an occurrence of an error that affects performance of an operation being performed by a database server; and
    in response to detecting the occurrence, automatically recording error information about the error in a storage space within a database that is managed by the database server;
    wherein the step of automatically recording the error information is performed by executing one or more computer instructions in a first code path of the database server;
    wherein the first code path is a separate code path than a second code path, of the database server, that is used to store user data within the database.

13. The non-transitory computer-readable storage medium of claim 12, wherein the instructions that cause the one or more processors to perform the step of automatically recording are included in a set of executable instructions of the database server.

14. The non-transitory computer-readable storage medium of claim 12, wherein the instructions that cause the one or more processors to perform the step of automatically recording comprise instructions which, when executed by the one or more processors, cause the one or more processors to perform the steps of:
    determining whether the storage space is filled up; and
    if the storage space is filled up, then automatically recording the error information over the oldest error information existing in the storage space.

15. The non-transitory computer-readable storage medium of claim 12, wherein the first code path is a code path dedicated to automatically recording the error information.

16. The non-transitory computer-readable storage medium of claim 12, wherein the one or more sequences of instructions further comprise instructions which, when executed by the one or more processors, cause the one or more processors to perform the steps of:
    determining what type of error occurred; and
    selecting which type of error information to store in the storage space based on the type of error that occurred.

17. The non-transitory computer-readable storage medium of claim 16, wherein the type of error information selected to be stored in the storage space includes at least one of a value of a parameter maintained by the database server, a value of a parameter maintained by an operating system, and a value of a parameter associated with a network connection.

18. The non-transitory computer-readable storage medium of claim 12, wherein the one or more sequences of instructions further comprise instructions which, when executed by the one or more processors, cause the one or more processors to perform the steps of:
    receiving, from a user, a database command that requests retrieval of the error information from the storage space;
    the database server executing the database command to retrieve the error information from the storage space; and
    returning the error information to the user.

19. The non-transitory computer-readable storage medium of claim 18, wherein the database command is a Structured Query Language (SQL) command.

20. The non-transitory computer-readable storage medium of claim 12, wherein the one or more sequences of instructions further comprise instructions which, when executed by the one or more processors, cause the one or more processors to perform the step of receiving configuration information from a user, wherein the configuration information determines a location and a size of the storage space.

21. The non-transitory computer-readable storage medium of claim 12, wherein the instructions that cause the one or more processors to perform the step of automatically recording the error information comprise instructions which, when executed by the one or more processors, cause the one or more processors to perform the steps of:
 determining whether errors have previously been detected; and
 recording error information only about errors that have not previously been detected.

22. The non-transitory computer-readable storage medium of claim 21, wherein the instructions that cause the one or more processors to perform the step of determining whether the errors have previously been detected comprise instructions which, when executed by the one or more processors, cause the one or more processors to perform the step of determining that the errors have not been encountered within a preset interval of time.

23. The method of claim 1, wherein the operation, whose performance is affected by the error, is executed in the second code path of the database server.

24. The non-transitory computer-readable storage medium of claim 12, wherein the operation, whose performance is affected by the error, is executed in the second code path of the database server.

* * * * *

UNITED STATES PATENT AND TRADEMARK OFFICE
CERTIFICATE OF CORRECTION

PATENT NO.         : 7,987,390 B2                                              Page 1 of 1
APPLICATION NO.    : 12/116145
DATED              : July 26, 2011
INVENTOR(S)        : Chandrasekaran It is certified that error appears in the above-identified patent and that said Letters Patent is hereby corrected as shown below:

In column 11, line 24, delete "one or mode" and insert -- one or more --, therefor.

In column 16, line 10, delete "Alterante" and insert -- Alternate --, therefor.

In column 17, line 32, delete "thread-id" and insert -- thread_id --, therefor.

In column 17, line 37, delete "thread-id" and insert -- thread_id --, therefor.

In column 21, line 18, in Claim 1, delete "path," and insert -- path --, therefor.

In column 21, line 20, in Claim 1, delete "path" and insert -- path, --, therefor.

Signed and Sealed this
Fifteenth Day of November, 2011

David J. Kappos
*Director of the United States Patent and Trademark Office*